FIG_12

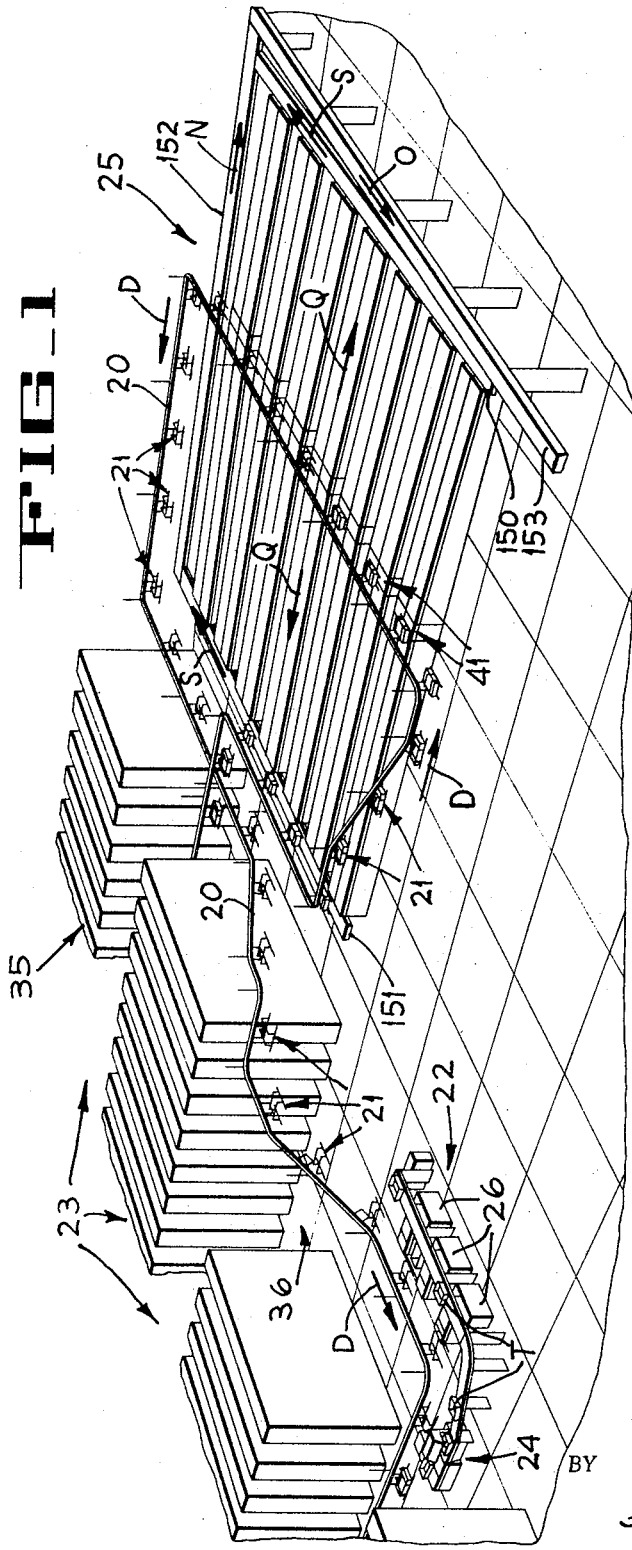

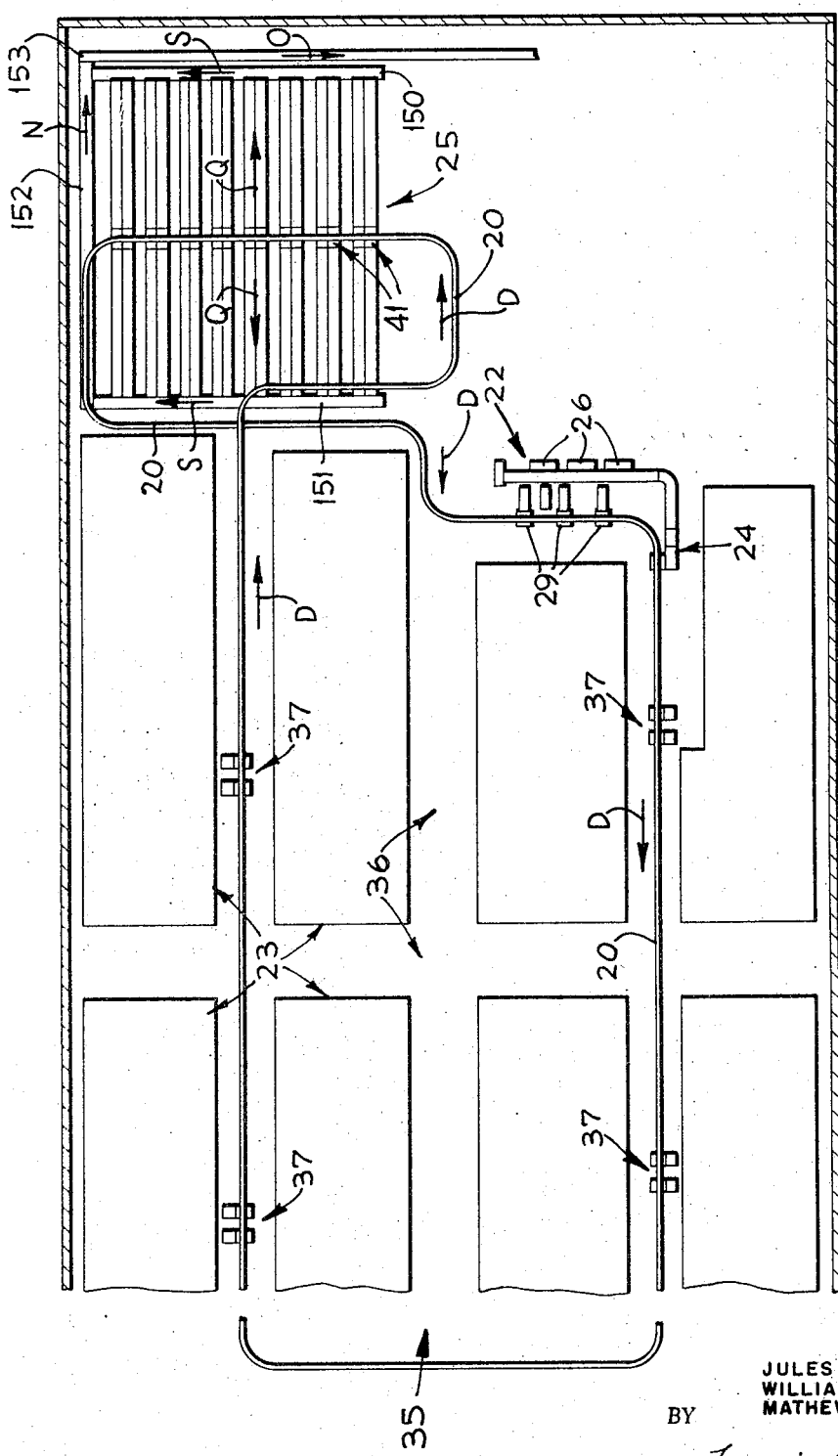
FIG_2

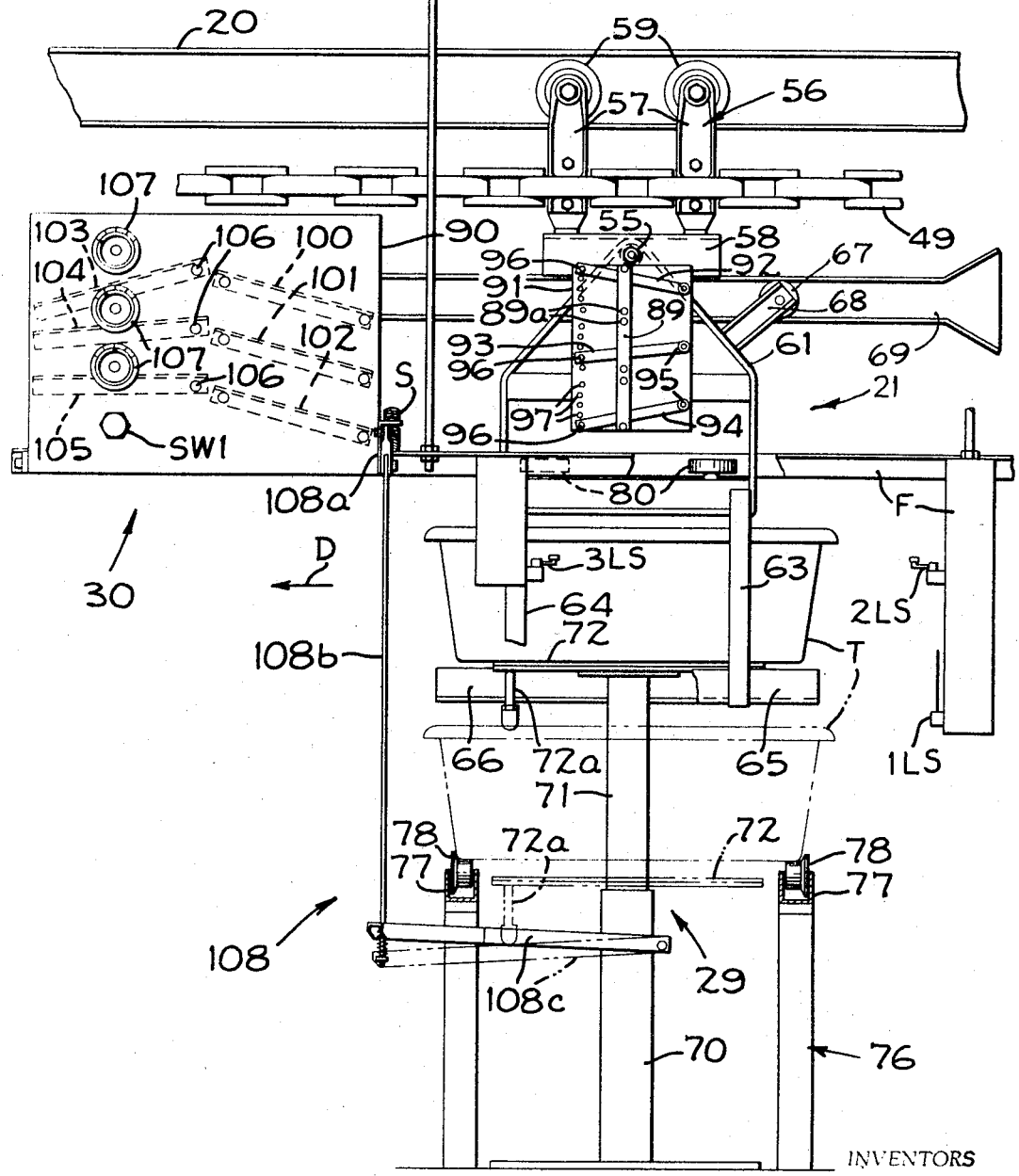

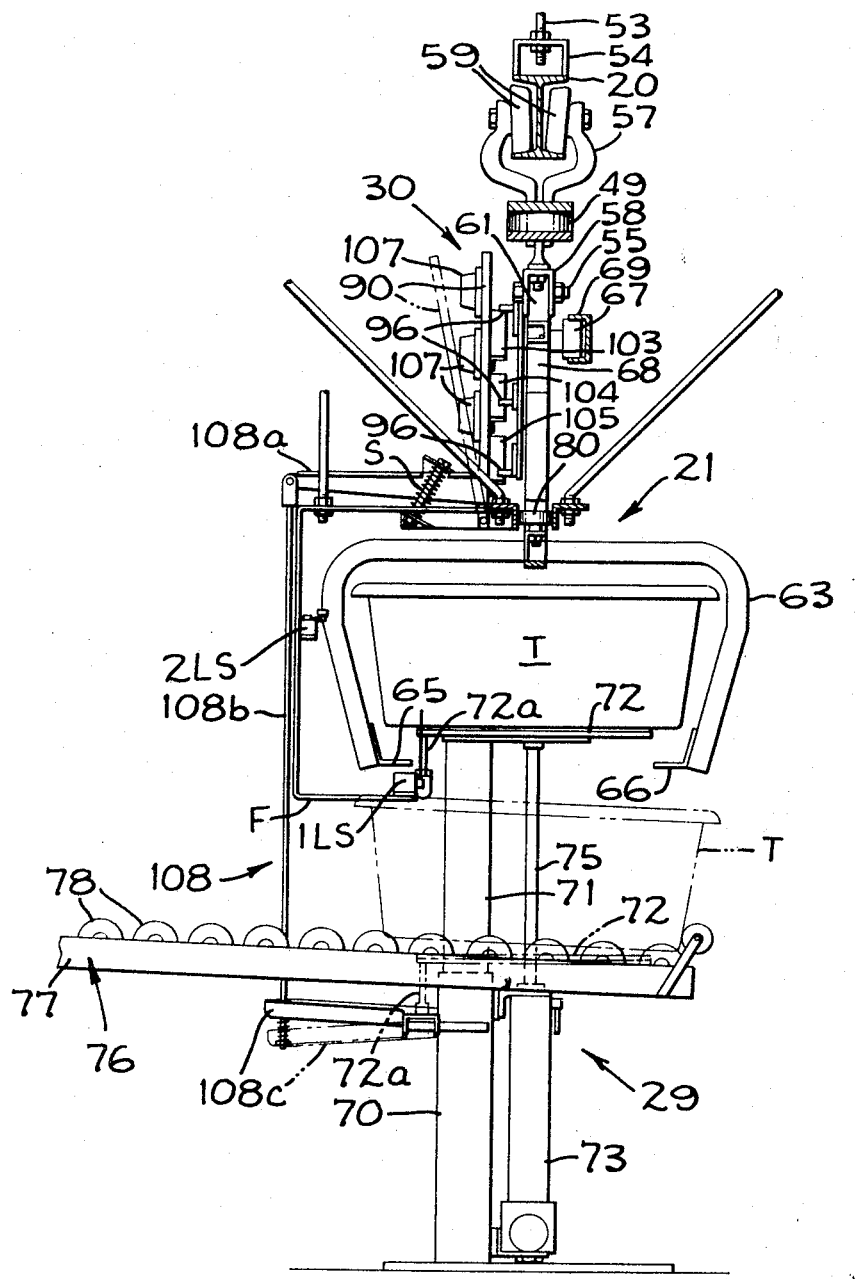

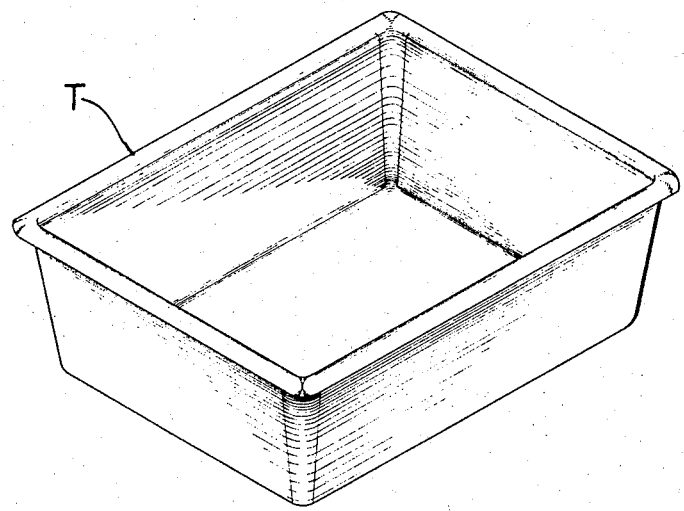
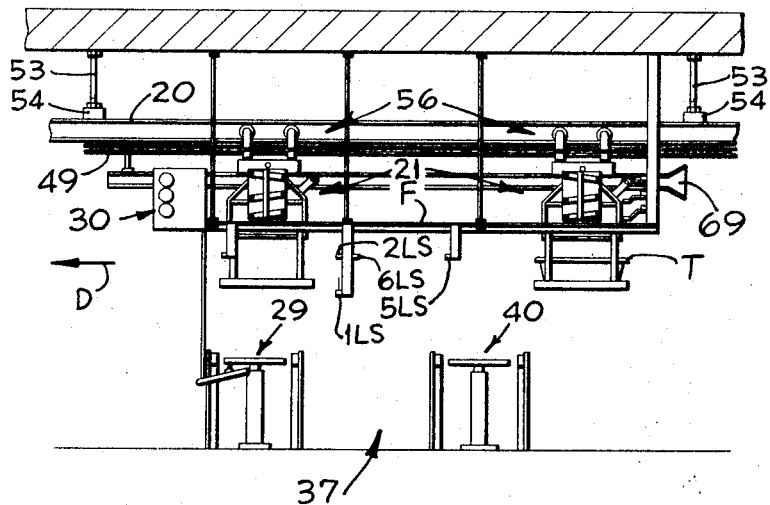

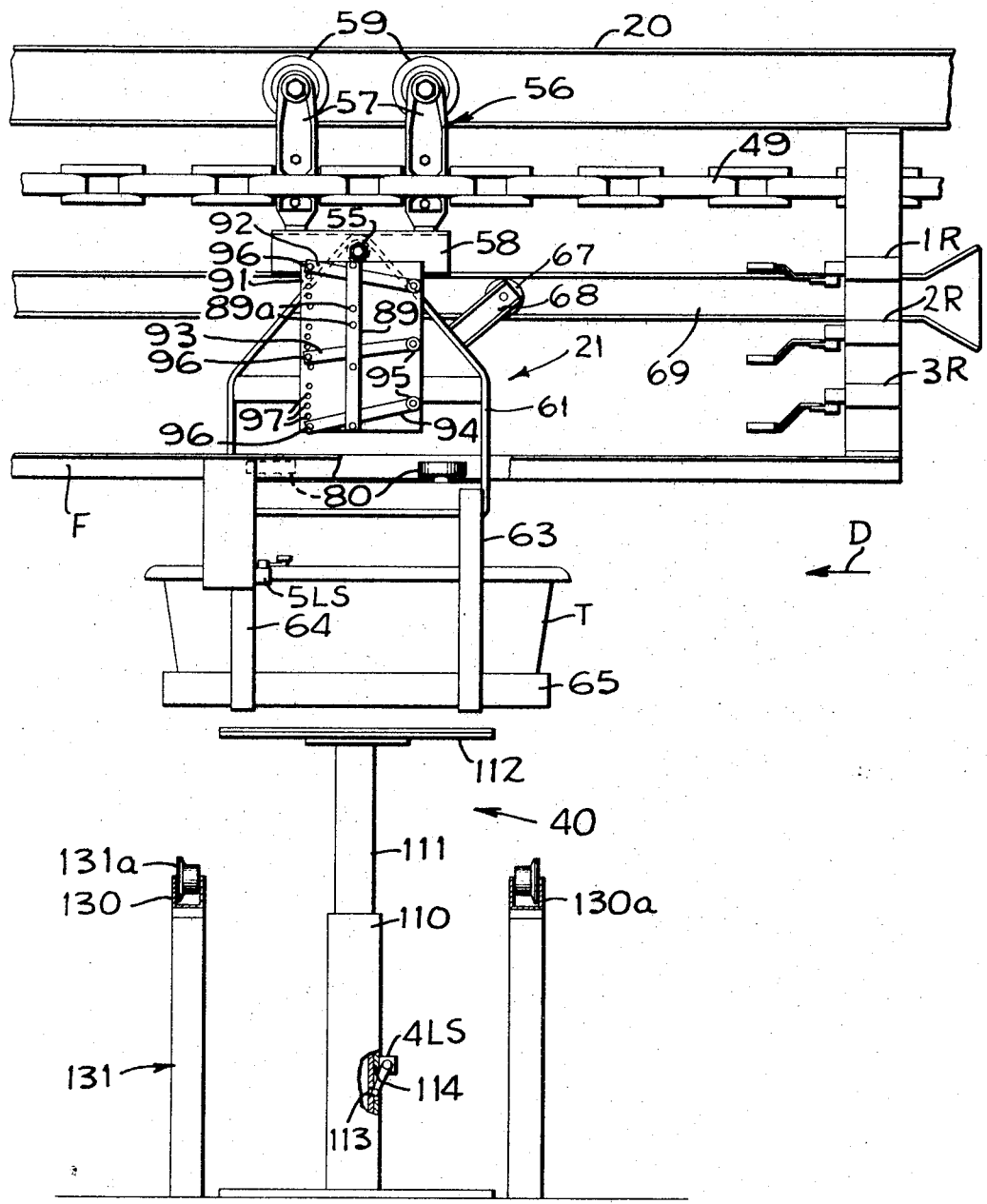
FIG_6

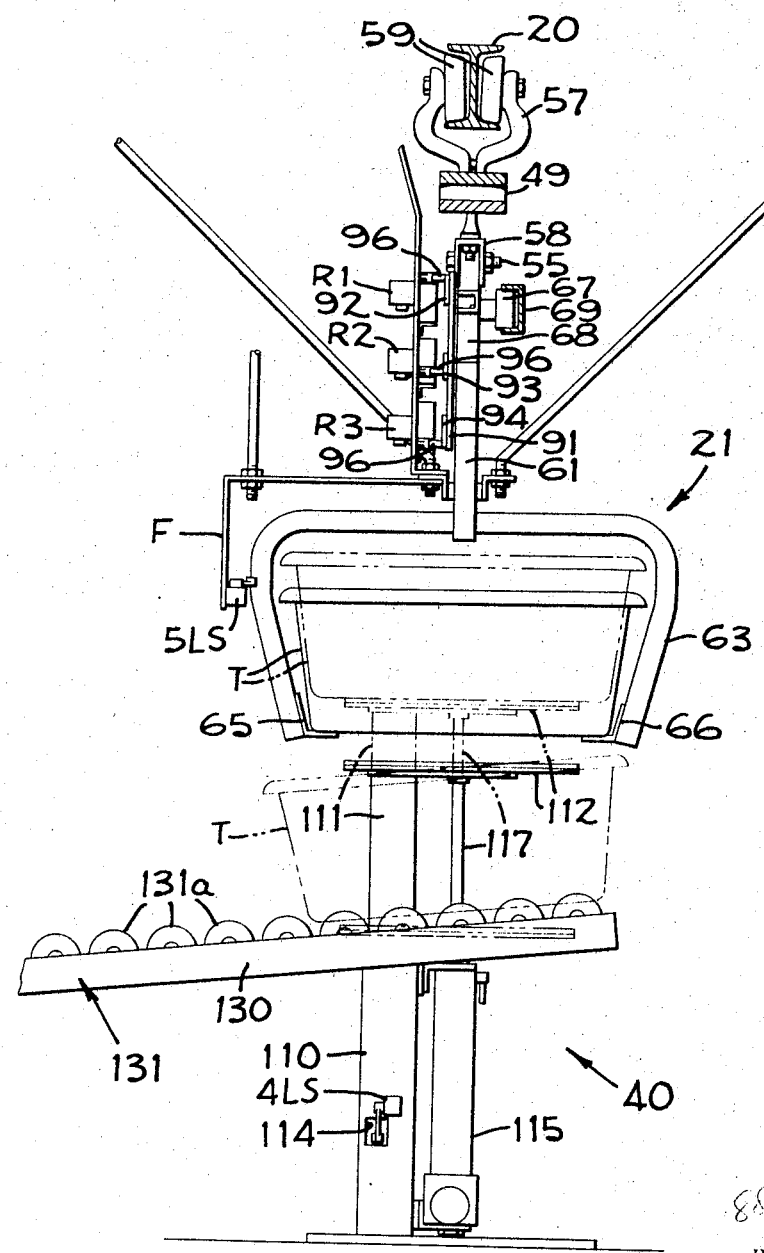

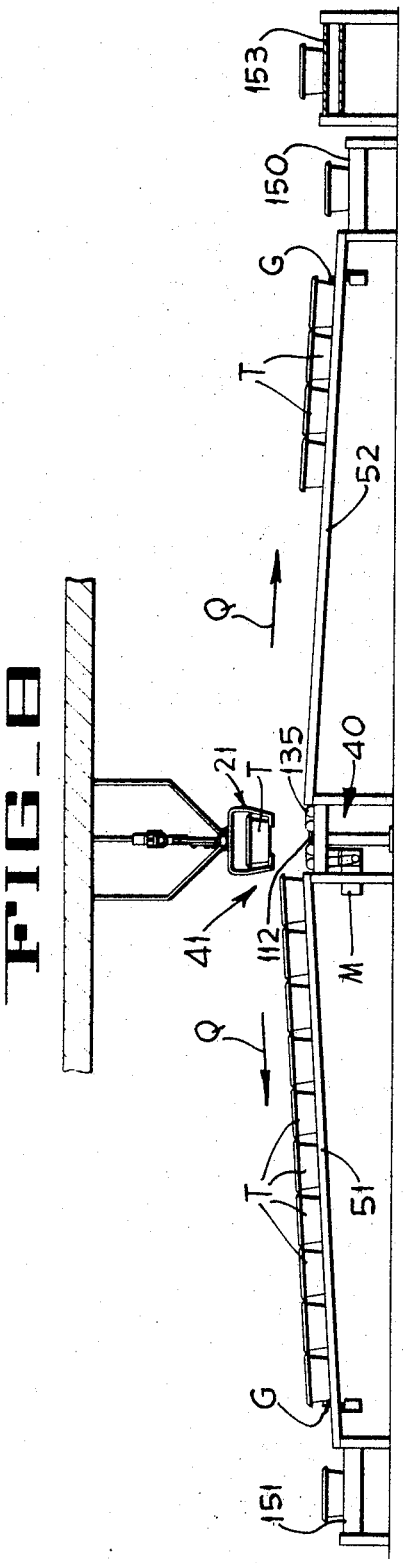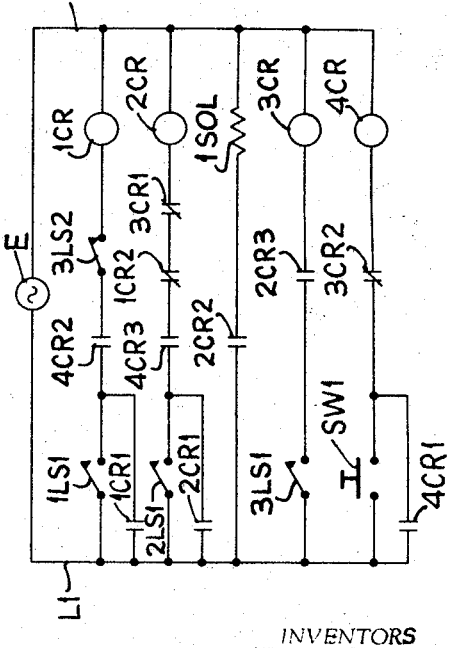

FIG_11

United States Patent Office 3,448,870
Patented June 10, 1969

3,448,870
CONVEYOR SYSTEM
Jules R. Gallo, Los Altos Hills, William W. Smith, San Jose, and Mathew G. Boissevain, Los Altos, Calif., assignors to FMC Corporation, San Jose Calif., a corporation of Delaware
Filed Dec. 21, 1966, Ser. No. 603,478
Int. Cl. B65g 17/44, 47/48, 49/00
U.S. Cl. 214—16          25 Claims

ABSTRACT OF THE DISCLOSURE

An endless conveyor for a large storage facility has continuously moving spaced carriers simultaneously to carry some articles to storage and other articles from storage. Tote boxes filled with articles for storage are loaded on empty moving carriers at replenishment stations and coded for automatic delivery to a particular storage station. Empty tote boxes with requests for articles are loaded on empty moving carriers at a dispatch station and coded for the storage station at which the articles are stored. Tote boxes with particular articles of an order are loaded on empty moving carriers at the storage station and coded in accordance with instructions from the dispatch station for delivery to a particular removal station, where all articles for a single order are assembled.

---

The present invention relates to an article conveyor system particularly suitable for a warehouse, or similar storage facility, where a large quantity of different articles are stored.

In a typical warehouse, or article storage facility, different articles are received, at different times, from suppliers or producers, for storage. Each article must be placed in a compartment, or storage bin, for that particular article when received to keep the different kinds of articles segregated. When an order is received for a particular assortment of stored articles, the articles must be gathered from the respective bins in which they are stored and delivered to a wrapping or shipping area. In a large, active, storage facility, articles continuously flow into, through, and out of the facility when the facility is operating. With a large, continuous, simultaneous flow of articles to different destinations within the storage facility, it is essential that accumulation or congestion of the articles, prior to reaching their destination, be avoided.

In general, the larger the storage facility, the greater the need for mechanization to reduce the cost of transporting the articles and to reduce errors in disposal and retrieval of the articles. The mere application of mechanization, however, does not assure lower costs, a reduction in errors, or smooth uncongested movement of articles throughout the facility. The use of mechanized apparatus, which is utilized only a small fraction of the operating time, will increase, not decrease, the cost of moving the articles. Apparatus which does not keep articles moving, and which permits an unmanageable accumulation of articles, invites an increase, not a decrease, in deposit and retrieval errors.

In the present invention, an article conveyor system is provided in which full utilization of the mechanized equipment is realized and in which articles are kept moving in an organized manner without accumulation or delay. In the preferred form of the invention, a rail which forms an endless, closed loop, has a plurality of equally spaced continuously moving trolleys thereon, each of which has a carrier permanently connected thereto. Throughout the system, articles are carried in tote boxes which are introduced onto, or taken off, moving carriers automatically. Only one article, or several identical articles, are carried in a single tote box. Along the path (defined by the rail) taken by the carriers, there are a replenishment zone having stations each with a loader mechanism, a removal zone having stations each with an unloader mechanism, a storage zone having stations each with a loader mechanism and unloader mechanism, and a dispatch station with a loader mechanism.

Articles (from a producer or supplier) which are to be stored are brought by any convenient means to the replenishment stations where they are placed in tote boxes by station attendants. In the usual case identical articles are carried in each tote box. The tote boxes are placed, single, on passing empty carriers automatically by the replenishment station loader mechanism, and each carrier which is loaded at the replenishment station is coded at that station by manually set code mechanism for a particular station in the storage zone near which the articles in the tote box on the carrier are to be stored. When the carrier is passing the storage station for which it is coded, the tote box is automatically removed from the carrier, and the carrier continues empty around the closed path.

An order for articles (say a dozen each of three different articles) is sent to the dispatch station where an attendant loads three empty tote boxes, one at a time, onto empty passing carriers. The three carriers are coded differently as they pass the dispatch station, each beng coded, by manually set coding mechanism, for the storage zone station nearest the bin in which one of the articles ordered is stored. Each tote box carries written instructions from the dispatch station attendant for the attendant a the storage station to which it is sent giving how many articles are required, and giving the particular station in the removal zone to which all the three dozen articles (three tote boxes) of that particular order are to be sent for consolidation.

The unloader mechanism at each of the three storage stations to which, respectively, the three tote boxes are sent, automatically unloads the empty tote boxes as the carriers pass the stations. The articles required are loaded by attendants in the three tote boxes at the respective stations, and the toe boxes are loaded onto passing empty carriers by the loader mechanisms at these storage zone stations. As the tote boxes are loaded onto carriers at the respective stations, all the carriers are coded by the station attendants with the coding mechanism as the carriers pass the respective stations. All three carriers are coded for delivery to the same station in the removal zone, where the three tote boxes are automatically unloaded by the unloader mechanism at that removal station as the carriers pass. The order, comprising three tote boxes (each with twelve articles), is automatically assembled on the conveyor table at the removal station called for in the written instructions of the attendant at the dispatch station, and, after the order is checked by an attendant at the removal station, the order is released by the attendant at the dispatch station for delivery by conveyors to a wrapping and/or shipping area.

In the system of the present invention, articles are carried into storage (from the replenishment zone to the storage zone) and carried out of storage (from the storage zone to the removal zone) at the same time, and with the same equipment (endless rail, trolleys, and carriers). The carriers move continuously, keeping the articles moving and preventing accumulation or congestion of the articles. Since carriers (including empty carriers) continuously circulate, articles from the replenishment zone (for the storage zone) and from the storage zone (for the removal zone) can be promptly loaded for carriage to desired destinations. Since each carrier going to a particular destination is coded for that destination, the articles will be removed automatically at the destination, whether an attendant is available at the destination station or not. All of the carriers continuously circulate, some with tote boxes being delivered and the rest empty available for receiving a tote box from any station with a loader mechanism it passes. None of the relatively costly carriers are ever in storage, or stopped waiting for tote boxes.

It is therefore one object of the present invention to provide an efficient, economically justified, conveyor organization for a large warehouse or storage facility. It is another object of the present invention to provide a conveyor system for a large storage facility capable of depositing articles in and retrieving articles from the facility at the same time with the same equipment. It is yet another object of the present invention to provide a conveyor organization in which article carriers are continuously circulating and are never stored, or stopped. It is still another object of the present invention to provide a conveyor system organization for a large warehouse, or storage facility, in which articles from a replenishment zone move continuously to a storage zone and at the same time articles from the storage zone move continuously to a removal zone.

In the drawings:

FIGURE 1 is a view in perspective of the conveyor organization of the present invention;

FIGURE 2 is a plan view of the apparatus of FIGURE 1;

FIGURE 3 is a side view in elevation of a station with a loader mechanism;

FIGURE 4 is an end view in elevation of the apparatus of FIGURE 3;

FIGURE 5 is a side view in elevation of a storage station;

FIGURE 6 is a side view in elevation of a station with an unloader mechanism;

FIGURE 7 is an end view in elevation of the apparatus of FIGURE 6;

FIGURE 8 is an end view in elevation of a removal station;

FIGURE 9 is a view in perspective of a tote box;

FIGURE 10 is a schematic electrical diagram of a station having a loader mechanism;

FIGURE 11 is a schematic electrical diagram of a station having an unloader mechanism;

FIGURE 12 is a schematic electrical diagram of a removal station and the unloader mechanism therein;

FIGURE 13 is a schematic pneumatic diagram of a loader mechanism; and

FIGURE 14 is a schematic pneumatic diagram of an unloader mechanism.

The conveyor organization disclosed herein has an endless track 20 which defines a path for a plurality of carriers 21 which move continuously along the endless path to carry articles in tote boxes T simultaneously into storage and from storage. Along the path defined by the track 20 are located a replenishment zone 22, a storage zone 23, a dispatch station 24, and a removal zone 25, as shown in FIGURES 1 and 2.

The replenishment zone has three identical replenishment stations 26, each with a loader mechanism 29 (FIGURES 3, 4) to load articles from the replenishment station onto the moving carriers, and each replenishment station has coding mechanism 30 (FIGURES 3, 4) for coding carriers which are loaded at that station for particular destinations. The storage zone 23 has groups 35 of bins, each group having aisles 36 for access by hand cart to individual bins. The storage zone also has four identical storage stations 37 (FIGURES 2, 5). Each storage station has a loader 29 (identical to the loader at each replenishment station) and each storage station has an unloader mechanism 40 (FIGS. 6, 7) to take articles from moving carriers at that station. As in the replenishment station, each storage station has coding mechanisms 30 (identical to the coding mechanism in the replenishment station) for coding carriers loaded at that station for particular destinations. The removal zone 25 has a plurality of identical removal stations 41 (FIG. 8). Each removal zone stations has an unloader mechanism 40 and two gravity conveyor tables 51 and 52, one on each side of the unloader mechanism.

The track 20 is defined by an I-beam which is supported from the ceiling by rods 53 attached to brackets 54 welded to the upper flange of the I-beam (see FIG. 5). As shown, for example, in FIGURE 3, each carrier 21 is pivotally suspended at 55 from a trolley 56 comprising two spaced vertical support members 57 and a horizontal support member 58 connected to the vertical support members. The vertical support members 57 each comprise a pair of hangers (see FIG. 4) straddling the I-beam and terminating in rollers 59 which ride on the upper surface of the lower flange of the I-beam. The trolleys, which are equally spaced along the path defined by the track 20, are connected to a drive chain 49 driven by electric motor (not shown) continuously during operation of the storage facility. The frame 61 of each carrier 21 has connected thereto two spaced bars 63, 64, formed as inverted U's, which envelope a tote box T received therein (FIG. 4). The bars 63, 64 are connected at their open ends by longitudinal stringers 65, 66 (that is, stringers extending parallel to the direction of travel of the carriers) which have inturned flanges on which a tote box T, received in the carrier, rests. A roller 67, connected by bar 68 to the carrier frame 61, rides in a track 69 to stabilize the carrier at the station.

No particular order, or sequence, is required for the zones, or stations, around the track. Indeed, stations of one type can be interspersed between stations of another type. Accordingly, no particular direction of movement of the carriers is required, although all carriers must travel in the same direction. With the carriers moving in a given direction, indicated herein by arrows D, the coding mechanism and the sensing mechanism (limit switches) in the stations must be positioned in accordance with the selected direction of carrier travel.

Each station has stationary frame members F which include angle members to define guides for rollers 80. Rollers 80 are mounted on each carrier 21, and, when passing between the guide frames at each station, prevent the carrier from swaying from side to side.

The loader mechanism 29, for use in the replenishment stations 26, the storage stations 37, and the dispatch station 24, and the coding mechanism 30 for use therewith, are shown best in FIGURES 3 and 4. The loader mechanism 29 comprises an upstanding housing 70 with a tube 71 slidably received in telescoping relationship therein. Tube 71 has a platform 72 mounted on the upper end thereof. A pneumatic cylinder 73, which is mounted vertically on the housing 70, has a piston 74 (see FIG. 13) therein. Piston 74 is connected to the lower end of a connecting rod 75, the upper end of which is connected to the platform 72. A gravity conveyor table 76 has a pair of side rails 77 with rollers 78 on which tote boxes ride. The conveyor table 76 terminates at the platform 72, which rises between side rails 77 from its lowermost position to lift tote boxes T off the conveyor table 76 for loading onto a carrier 21.

After the tote box T at the lower end of conveyor 76 has been loaded with a group of identical articles, the three digit code number of the desired destination for that tote box is dialed into the coding mechanism 30 by the station attendant, who then pushes the ready switch SW1. There are three limit switches mounted on the frame F of the stations where loading occurs, 1LS, 2LS and 3LS which are encountered in that order by an approaching carrier. The first limit switch encountered, 1LS, is in the path of a tote box on the carrier; the second and third limit switches encountered, 2LS and 3LS, are in the path of the carrier. Each carrier passes the last limit switch 3LS before the next carrier encounters the first limit switch 1LS.

The electrical circuit for stations having a loader mechanism is shown schematically in FIGURE 10. In that diagram, as well as the electrical diagrams of FIGURES 11, 12, the relay switch contacts are numbered to correspond to the relay by which they are operated, a numerical suffix being added to the contact numbers to distinguish between different switch contacts of the same relay. Normally open relay switch contacts are shown as parallel lines; normally closed relay switch contacts are shown as parallel lines with a diagonal line therethrough. Normally open limit switch contacts are indicated by an inclined switch arm connected to one contact only; normally closed limit switch contacts are indicated by a switch arm connected to one contact and engaged with the other contact.

As shown in FIGURE 10, normally open limit switch contacts 1LS1, normally open relay contact 4CR2, and normally closed limit switch contacts 3LS2 are connected in series with control relay 1CR across lines L1 and L2, which are connected to opposite sides of a source of energy E. Normally open sealing contacts of relay 1CR, contacts 1CR1, are connected across limit switch contacts 1LS1. Normally open contacts 2LS1 of limit switch 2LS, normally open relay contacts 4CR3, normally closed relay contacts 1CR2, and normally closed relay contacts 3CR1, are connected in series with control relay 2CR across lines L1 and L2. Normally open relay contacts 2CR1 are connected across limit switch contacts 2LS1. Normally open relay contacts 2CR2 are connected in series with solenoid 1SOL across the lines L1 and L2. Normally open limit switch contacts 3LS1 and normally open relay contacts 2CR3 are connected in series with control relay 3CR. Push button switch SW1 and normally closed relay contacts 3CR2 are connected in series with relay 4CR across lines L1 and L2. Normally open sealing contacts 4CR1 of relay 4CR are connected across switch SW1.

A pneumatic circuit diagram for a station having a loader mechanism 29 is shown in FIGURE 13. A valve V1 has a pressure port connected to pressure line 80, two exhaust ports connected to exhaust lines 81, 82, and two motor ports connected to motor lines 83, 84. The exhaust lines 81, 82, which vent to the atmosphere, have adjustable restrictions 85, 86, respectively, therein. The motor line 83 is connected to the lower end of the pneumatic cylinder 73 below the piston 74 therein, and motor line 84 is connected to the upper end of the pneumatic cylinder above the piston. When solenoid 1SOL is deenergized, the movable valve member 87 is urged to the left (as viewed in FIG. 13) by spring 88, and pressurized air is introduced from line 80, through valve V1 and motor line 84, to the upper end of the cylinder above the piston. Air is exhausted from below the piston through motor line 83, through the valve V1, and through discharge line 81 past restriction therein. When solenoid 1SOL is energized and valve member 87 is shifted to the right (as viewed in FIG. 13), pressurized air is introduced from line 80, through valve V1, through motor line 83, to the lower end of the cylinder below the piston therein. Air from above the piston is exhausted through motor line 84, through valve V1, through discharge line 82 and past restriction 86 therein.

After a tote box T, which is positioned at the lower end of loading conveyor 76 over platform 72, has been loaded with one or more of a particular article by the station attendant, he depresses push button switch SW1 (see FIG. 10). Since, at this time, relay 3CR is deenergized and normally closed contacts 3CR2 thereof are closed, relay 4CR is energized. Energization of relay 4CR closes normally open contacts 4CR1, 4CR2, and 4CR3. Closing of contacts 4CR1 seals in relay 4CR around the push button switch SW1. When a carrier with a tote box approaches the station, the tote box strikes and operates limit switch 1LS which is in the path of a tote box on the carrier. Operation of limit switch 1LS closes normally open limit switch contacts 1LS1, and relay 1CR is energized and sealed in around limit switch contacts 1LS1. When relay 1CR is energized, normally closed contacts 1CR2 thereof open so that when the carrier strikes and operates limit switch 2LS, relay 2CR will not be energized, and the loader 29 will not be operated. When the carrier hits and operates limit switch 3LS, relay 3CR is not energized because normally open contacts 2CR3 are open, and relay 4CR remains energized because normally closed contacts 3CR2 remain closed.

When an empty carrier passes limit switch 1LS, that limit switch is not operated and relay 1CR is not energized. Consequently, when the carrier hits and operates limit switch 2LS, the contacts 2LS1 thereof close and relay 2CR is energized through normally closed contacts 1CR2 which are closed. Relay 2CR is sealed in through relay contacts 2CR1. When relay 2CR becomes energized, contacts 2CR2 thereof close to energize solenoid 1SOL. The energization of solenoid 1SOL shifts the movable valve member 87 of valve V1 to the right to raise the piston 74, and the platform 72 connected thereto. The rate of rise of platform 72 (established by adjustment of restriction 86) is coordinated with the speed of the carriers on the line, and the position of limit switch 2LS, so that platform 72 is in its extreme upper position before the empty carrier comes into registration therewith. In the uppermost position of platform 72, the bottom of the tote box T is a small distance, say 1½ inches, above the inturned flanges 65, 66 on the carrier. Just before the carrier is in full registration with the tote box held on the platform, the carrier strikes limit switch 3LS, energizing relay 3CR. When relay 3CR becomes energized, normally closed contacts 3CR1 and 3CR2 thereof open and relays 2CR and 4CR become deenergized. When relay 2CR is dropped the normally open contacts 2CR2 thereof open and solenoid 1SOL is dropped. At the same time, normally open contacts 2CR3 of relay 2CR open and relay 3CR is dropped. When solenoid 1SOL is deenergized, valve member 87 is shifted to the left by spring 88, and the platform descends. After it moves down 1½ inches, the tote box is supported by the carrier and is carried thereby away from the loading station. The platform 72 continues to descend until it reaches its lowermost position, ready to receive the next tote box for loading.

The coding mechanism 30 at each station at which loading occurs has a code plate 90 (see FIGURE 3) mounted at the station which cooperates with coding apparatus on the carriers. Each carrier has a code plate 91 which has three code arms 92, 93 and 94, one above the other, each code arm pivotally connected to the plate at one end, as indicated at 95. A guide bar 89 has studs 89a which limit the angular range through which the code arms can swing. A pin 96 extends through each code arm at the end opposite the pivotal connection to the plate. The pins 96 cooperate with a plurality of depressions 97 (five for each code arm) to define a detent for the arm, holding the arm in any angular position in which it is set. The code plate 90 mounted at the load station has three fixed reset ramps 100, 101, 102, and three pivotal set ramps 103, 104, 105, which can swing about a pivot pin at one end as indicated at 106. The angular position of the set ramps are adjusted by set knobs 107 which have cams (not shown) connected thereto always engaged with the pivotal ramps. A particular angular position of the knob 107 (and the angular position of a cam connected thereto) corresponds to a particular digit, and when a particular three digit number is put on the dials (one digit per dial) the three set ramps will swing to angular positions peculiar to the particular digits dialed in by the knobs. All of the ramps, which are L-shaped angles, are engaged by the pins 96 extending through the code arms on the carrier.

When a tote box is on the loading conveyor ready for loading, the desired destination of the box (that is, a three digit code number corresponding to the station number to which the tote box is to be sent) is set on the dials by the station attendant. Afer the tote box is transferred from the platform 72 to a particular moving carrier 21, that carrier is automatically coded by the station code mechanism 30 as it moves past the code plate 90 thereof. The pins 96 at the ends of the code arms ride up the fixed reset ramps 100, 101, 102 swinging all the code arms clockwise to their uppermost position, thereby erasing any code number which may previously have been on the carrier. The pins 96 on the carrier code arms then engage the adjustable set ramps 103, 104, 105, swinging the code arms countercolckwise to unique positions determined by the particular angle of the set ramps. Since these ramp angles correspond to the desired code number of the destination, the code arms on the carrier will correspond in position to the code number of the desired destination.

After the code number of the destination has been set on the carrier, it is necessary to disable the code mechanism at the loading station until another carrier is loaded at the station. It is only the carriers loaded at a particular station which are coded at that station, and the code mechanism thereof must be prevented from coding all other carriers (either empty or loaded at other stations) which pass the station. Any method of rendering the coding mechanism 30 of a particular station effective only for carriers loaded at that particular station, can be used in the present invention. However, for illustrative purposes, there is shown apparatus for performing this function which is the subject of a copending patent application entitled Intermittently Operable Coding Mechanism for Conveyor System of Mathew G. Boissevain, Ser. No. 603,570, filed Dec. 21, 1966, now U.S. Patent 3,351,176, assigned to the same assignee to which the present invention is assigned. Briefly, the code plate 90 is mounted on frame F at the station so that it may tilt slightly away from the path of the carriers. When the plate 90 is tilted to its retracted position, the set and reset ramps thereof will not engage the pins on code arms of passing carriers. In order to tilt the code plate 90 away from the path of the carriers, a linkage mechanism 108 (comprising arm 108a secured to the code plate and extending rearwardly therefrom (FIGURE 4), rod 108b, and lever arm 108c pivotally connected to loader housing 70) is connected between the loader 29 and the code plate 90. A spring S, connected between the frame F and tion where the ramps thereon will be effective to reset and set the code arms of passing carriers. The linkage mechanism is actuated by a depending member 72a on the platform 72. Thus, when the paltform 72 is down, the coding mechanism is ineffective for coding carriers; when the platform 72 is up, the coding mechanism will code a carrier which passes. After a carrier is loaded from a particular station, the platform of that station will be down and the station code mechanism retracted before the next carrier passes the code mechanism 30.

The storage stations and the removal stations have unloader mechanisms 40, shown in FIGURES 6 and 7. In the storage station, the unloader mechanism 40 is adjacent to, and on the downstream side of, the loader mechanism 29, as shown in FIGURE 5. At each station having an unloader mechanism 40, the frame F has mounted thereon three limit switches 1R, 2R, 3R (which read the code on the passing carriers) limit switch 5LS, and limit switch 6LS. An approaching carrier first encounters the limit switches 1R, 2R, and 3R which, together, are vertically positioned to correspond to a unique three digit code number for that particular station. Each limit switch (1R, 2R, 3R) corresponds to one digit of the code member, and each is aligned with, and in the path of, the pin 96 on the end of one of the code arms 92, 93, 94 when, and only when, the code arm is in the particular code position of the number corresponding to the digit that limit switch represents. Thus, all three limit switches 1R, 2R, 3R will operate simultaneously when a carrier which is coded for that station approaches the station.

The unloader mechanism (FIGS. 6, 7) has an upstanding housing 110 in which a tube 111 is received in telescoping relationship. A platform 112 is mounted on the upper end of tube 111. The tube, at its lower end, has an opening indicated at 113. A limit switch 4LS is mounted on the housing and has a switch arm extending through an opening 114 in the housing. The limit switch 4LS is operated when the tube opening 113 is in registration with housing opening 114, which occurs when the platform 112 is in an intermediate position a small distance, say, for example, 1½ inches below the bottom of a tote box on a carrier. A vertical pneumatic cylinder 115 is connected to the housing. Cylinder 115 slidably receives a piston 116 (see FIG. 14) therein. The piston 116 has a connecting rod 117 connected at one end to the piston 116 and at the opposite end to the platform 112.

The limit switch 5LS is positioned on frame F (at each station having an unloader mechanism) to be hit and operated by an approaching carrier when the carrier is almost directly over the platform 112. Limit switch 6LS is positioned at these stations on frame F to be hit and operated by a carrier which has passed the unloader mechanism (see FIG. 5).

The electrical diagram for unloader mechanism is shown in FIGURE 11. Normally open limit switch contacts 1R1, 2R1, and 3R1 are connected in series across lines L1, L2 with normally closed relay contacts 8CR2 and relay 14CR. A normally open sealing contact 14CR1 is connected across limit switch contacts 1R1, 2R1, and 3R1. Solenoid 3SOL is connected in series across lines L1, L2 with normally open relay contacts 14CR2 and normally closed relay contacts 6CR2. Normally open relay contacts 7CR2 are connected across contacts 14CR2 and 6CR2. Relay 6CR is connected in series across lines L1, L2 with normally open limit switch contacts 4LS1 and normally open relay contacts 14CR3. Solenoid 5SOL is connected across lines L1, L2 in series with normally open relay contacts 6CR1 and normally closed relay contacts 7CR3. Relay 7CR is connected in series across lines L1, L2 with normally open limit switch contacts 5LS1, normally closed relay contacts 8CR3, and normally open relay contacts 14CR4. Normally open contacts 7CR1 are connected across limit switch contacts 5LS1. Relay 8CR is connected across lines L1, L2 in series with normally open limit switch contacts 6SL1 and normally open, relay contacts 14CR5. Normally open contacts 8CR1 are connected across limit switch contacts 6LS1. Relay 9CR is connected in series with normally open contacts 8CR3 across lines L1, L2, and normally open contacts 9CR1 and normally closed contacts 14CR6 are connected across contacts 8CR3. Solenoid 4SOL is connected in series with normally open contacts 9CR2 across lines L1, L2.

The pneumatic circuit for the unloader mechanism 40 is shown in FIGURE 14. A spring centered solenoid valve V2 has a pressure port connected to a penumatic pressure line 120, two discharge ports connected to discharge lines 121, 122, and two motor ports connected to motor lines 123, 124. Motor line 123 is connected to the upper end of cylinder 115 above piston 116 and motor line 124 is connected to the lower end of cylinder 115 below piston 116. Discharge line 121, which vents to the atmosphere, has an adjustable restriction 125 therein, and discharge line 122, which also vents to the atmosphere, has an adjustable restriction 126 therein. Valve V2 has a shiftable valve member 127 connected at one end to solenoid 3SOL and connected at the opposite end to solenoid 4SOL. Springs 128, 128a at the ends of the valve member center the valve member when neither solenoid is energized.

A carrier which is coded for a particular unload station will operate all three limit switches 1R, 2R and 3R simultaneously as the carrier approaches that particular station. Since relay 8CR is deenergized at this time, and normally closed contact 8CR2 thereof is closed, relay 14CR becomes energized and is sealed in through contacts 14CR1. At this time relay 6CR is deenergized and contacts 6CR2 thereof are closed so, when relay 14CR becomes energized to close contact 14CR2, solenoid 3SOL becomes energized. When solenoid 3SOL is energized, valve member 127 is shifted to the right and air from pneumatic pressure line 120 is introduced through valve V2 and motor line 124 to cylinder 115 below the piston 116 therein. Air above piston 116 is exhausted through line 123, through valve V2, and through discharge line 122 past restriction 126 to atmosphere. Piston 116, and platform 112 connected thereto, will rise at a rate determined by the setting of adjustable restriction 126.

When the platform 112 reaches the intermediate position just below the level of the bottom of an approaching tote box, limit switch 4LS is operated by the arm thereof moving into tube opening 113, and normally open contact 4LS1 thereof closes. Since relay 14CR is energized at this time, assuming the carrier approaching is coded for this particular station, relay 6CR becomes energized. When relay 6CR becomes energized, normally open contacts 6CR1 thereof close and, since relay 7CR is deenergized at this time and normally closed contacts 7CR3 thereof closed, solenoid 5SOL becomes energized. At the same time, normally closed contacts 6CR2 open, deenergizing solenoid 3SOL. Deenergization of solenoid 3SOL allows spring 128a to return the valve member 127 to a central position, blocking the flow of air to and from pneumatic cylinder 115 and stopping advance of piston 116 and the platform 112 connected thereto. Energization of solenoid 5SOL extends plunger 129 into an opening 129a in tube 111 to lock the tube 111 in the intermediate position.

When the tote box T is almost in registration with platform 112, limit switch 5LS is operated by the carrier and normally open contact 5LS1 thereof is closed. Relay 8CR is deenergized at this time, and normally open contacts 8CR3 thereof closed. Relay 14CR is energized, and normally open contacts 14CR4 thereof closed. Therefore, relay 7CR is picked up, and sealed in through normally opened contacts 7CR1. When relay 7CR is energized, normally open contacts 7CR2 thereof close to energize again solenoid 3SOL. At the same time, normally closed contacts 7CR3 open to drop solenoid 5SOL, releasing the platform lock. The reenergization of solenoid 3SOL causes the platform 112 to resume its upward travel, taking the tote box T off the flanges 65, 66 of the carrier. The piston 116 stops when it reaches the upper limit of its travel in cylinder 115.

The continuously moving carrier moves out from under the tote box T and, after leaving the tote box, the carrier hits and operates limit switch 6LS. Normally open limit switch contacts 6LS1 close and, since relay 14CR is still energized, relay 8CR becomes energized and is sealed in through the normally opened contacts 8CR1. As soon as relay 8CR is energized, contacts 8CR3 thereof close to energize relay 9CR. At the same time, normally closed contacts 8CR2 open, deenergizing relay 14CR. When relay 14CR becomes deenergized, solenoid 3SOL, relay 6CR, and relay 7CR all become deenergized. At the same time, normally closed contacts 14CR6 close and relay 9CR is sealed in through contacts 9CR1 and contacts 14CR6. After a short delay, the normally open delay open, contacts 14CR5 open, deenergizing relay 8CR. When relay 9CR became energized, solenoid 4SOL became energized, shifting valve member 127 to the left. Air under pressure then passes from pressure line 120, through the valve V2 to motor line 123, and enters cylinder 115 above the piston 116. Air below the piston 116 exhausts through line 124, through valve V2, and through discharge line 121 past the restriction 125 therein. The platform will then descend at a rate determined by the adjustment of restriction 125.

At the storage stations, the platform 112 descends between the rails 130, 130a of an unloading conveyor 131 to a level below the level of the rollers 131a of the conveyor (see FIGS. 6 and 7). The conveyor 131 slopes away from the platform so that a tote box which is deposited on the conveyor by a descending platform is carried by gravity away from the unloader. The tote box moves to a position where it can be unloaded by the attendant without blocking the unloader which may, at any time, be called to unload another carrier.

The unloading stations in the removal zone have an unloader mechanism 40 identical to the unloading mechanism in the storage stations. However, in the removal stations, tote boxes are laid on a motor driven conveyor 135 as the platform 112 descends to its lowermost position. The power conveyor 135 moves the tote boxes to the left or to the right (as viewed in FIG. 8) depending on the code on the carrier. At each end of the power conveyor 135, there is a gravity conveyor table 51, 52, which receives tote boxes from the power conveyor and moves the tote boxes as indicated by arrows Q. In the removal zone, the first two code digits indicate a particular removal station and the third code digit indicates which conveyor table 51, or 52, will receive the articles.

A schematic electrical diagram of the removal station is shown in FIGURE 12. Relay 20CR is connected in series with normally open limit switch contacts 3R2 and normally open relay contacts 21CR7. Normally open contacts 20CR5 are connected across limit switch contacts 3R2. Relay 21CR is connected across lines L1, L2 in series with normally open limit switch contacts 1R2 and 2R2, and normally closed relay contacts 24CR2. Normally open relay contacts 21CR1 are connected across the limit switch contacts 1R2 and 2R2. One side of electric motor M is connected selectively to line L1 or line L2 through two alternate paths, one path from line L1 containing normally open contacts 20CR1 and normally open contacts 21CR8, and the other path from line L2 containing normally closed contacts 20CR4. The other side of motor M is connected selectively to line L1 or L2 through two alternate paths, one path from line L2 containing normally open contacts 20CR2 and the other path from line L1 containing normally closed contacts 20CR3 and normally open contacts 21CR9. Solenoid 3SOL is connected across lines L1 and L2 in series with normally open relay contacts 21CR2 and normally closed relay contacts 22CR2. Normally open relay contacts 23CR2 are connected across the contacts 21CR2 and 22CR2. Relay 22CR is connected across lines L1 and L2 in series with normally open limit switch contacts 4LS2 and normally open relay contacts 21CR3. Solenoid 5SOL is connected across lines L1 and L2 in series with normally open relay contacts 22CR1 and normally closed relay contacts 23CR3. Relay 23CR is connected in series across lines L1 and L2 with normally open limit switch contacts 5LS2, normally closed relay contacts 24CR3, and normally open relay contact 21CR4. Sealing contacts, normally opened relay contacts 23CR1, are connected across the limit switch contacts 5LS2. Relay 24CR is connected across lines L1 and L2 in series with normally open limit switch contacts 6LS2 and normally open, delay open, relay contacts 21CR5. Normally open relay contacts 24CR1 are connected across limit switch contacts 6LS2. Relay 25CR is connected across lines L1 and L2 in series with normally open relay contacts 24CR3. Normally open relay contacts 25CR1 and normally closed relay contacts 21CR6 are connected in series across the relay contacts 24CR3.

Solenoid 4SOL is connected in series across lines L1, L2 with normally open relay contacts 25CR2.

As a carrier coded for a particular station in the removal zone approaches that station, limit switches 1R and 2R of that station will be hit and operated by the code mechanism on the carrier. Code mechanism will hit and operate limit switch 3R if the tote box is scheduled to go to the left conveyor table, but will not hit the limit switch 3R if the tote box is to go to the right table (as viewed in FIG. 8). When limit switches 1R and 2R are operated, relay 21CR is energized since relay 24CR is deenergized at this time, and normally closed contacts 24CR2 thereof are closed. When relay 21CR is energized, all the normally open contacts thereof close, including contacts 21CR1 to seal in relay 21CR around the limit switch contacts 1R2 and 2R2. If limit switch 3R is operated, normally open contacts 3R2 close and relay 20CR is energized. Relay 20CR is sealed in around the normally open limit switch contacts 3R2. If relay 20CR and 21CR are energized, motor M is connected in one manner across lines L1 and L2 to drive the power conveyor in one direction; if relay 20CR is deenergized and relay 21CR energized, motor M is connected reversely across the lines L1, L2 to drive the power conveyor in the opposite direction.

When relay 21CR becomes energized, solenoid 3SOL becomes energized, since relay 22CR is deenergized at this time and normally closed contacts 22CR2 thereof are closed. Energization of solenoid 3SOL begins the upward travel of platform 112. When platform 112 is at the intermediate position just below the level of the bottom of the tote box, limit switch 4LS is operated and relay 22CR becomes energized, dropping out solenoid 3SOL. At the same time, solenoid 5SOL becomes energized, since relay 23CR is deenergized at this time and normally closed contacts 23CR3 thereof are closed. Energization of solenoid 5SOL extends plunger 130 to lock the platform at the intermediate position.

When the carrier is almost directly above the platform, limit switch 5LS is hit and operated, closing normally open contacts 5LS2. Thus, at this time, relay 23CR is energized and sealed in around limit switch contacts 5LS2. Energization of relay 23CR again energizes solenoid 3SOL and deenergizes solenoid 5SOL. The platform lock is therefore released and the platform moves up to its upper limit of movement, taking the tote box off the carrier.

After the continuously moving carrier clears the tote box, limit switch 6LS is hit and operated, closing normally open contacts 6LS2 thereof, and energizing relay 24CR, which is sealed in around limit switch contacts 6LS2. When relay 24CR is energized, relay 25CR is picked up through the contacts 24CR3, relay 25CR being sealed in through contacts 25CR1 and 21CR6. When relay 24CR becomes energized, normally closed contacts 24CR2 thereof open, and relay 21CR is dropped. Deenergization of relay 21CR deenergizes relay 20CR, relay 22CR, relay 23CR, and, after a short delay, relay 24CR. When relay 25CR becomes energized, solenoid 4SOL is energized to lower the platform to its lowermost position, below the level of the power conveyor. The power conveyor then moves the tote box to the right or left onto the gravity tables 51 or 52 which slope downwardly away from the removal station. The gravity tables take the tote boxes away from the removal station which, at any time, may be called on to unload another carrier.

One station in the removal zone, preferably the last station encountered by the continuously moving carriers as they pass through the removal zone, has a plurality of sets of limit switches, each set comprising three limit switches positioned for operation by the three code arms on a carrier. Each set is positioned for simultaneous operation by carrier code arms set to a three digit code position corresponding to a three digit code number not used by any station throughout the system. Together, all the sets of limit switches at this station are positioned for operation by all the three digit code numbers possible which have not been used elsewhere in the system. Thus, if any carrier with articles thereon is erroneously coded with a number which does not correspond to a particular station in the system, the carrier will not travel continuously around the endless track but will, instead, be delivered to this particular station in the removal zone. Articles accumulating at this "dead end" station are taken care of by an attendant.

In operation of the conveyor system disclosed herein, articles brought in for storage, as from a supplier or producer, are brought to the three replenishment stations 26 by power driven or push carts. If, for example, three of article A, four of article B, and one of article C are brought to the replenishment station 26, the three articles A are loaded in one tote box by the attendant, and the code mechanism at station 26 is set by the attendant for the storage station, say 210, nearest the bin where the articles A are stored. The tote box is then loaded automatically on the next empty carrier which is automatically coded for delivery to storage station 210. After the articles A have left the replenishment station 26, the next tote box is loaded by the attendant with the four articles B, and the code mechanism is coded by the attendant for the nearest station, say 230, to the bin in which articles B are stored. The tote box is then loaded on the next empty carrier which is automatically coded as it passes the code mechanism of station 26. The same procedure is followed for loading article C.

When the A articles reach storage station 210 and the B articles reach storage station 230, the tote boxes in which they are carried are automatically unloaded in response to the limit switches at these stations which are operated by the code arms on the carriers. Attendants then cart the articles by hand cart to the proper bins for storage.

Orders for delivery from storage are sent to the dispatch station. If, for example, a single order calls for two A articles and five B articles, a paper for each article is prepared at the dispatch station, giving the quantity desired and the table in the removal station, say 521, at which the order is to be assembled, or consolidated. The attendant at the dispatch station puts the paper for article A in an empty tote box, and then codes the coding mechanism at the dispatch station for the station, say 210, nearest the bin in which article A is stored. The tote box for article A is then placed on the conveyor at the dispatch station for transfer by the loader mechanism to the next empty carrier. The same procedure is followed for article B, the tote box being coded for storage station 230 nearest the bin in which articles B are stored. Both papers designate the same removal station and consolidation table (521) in the removal zone.

When the tote boxes from the dispatch station with the written orders are received at the respective storage stations, attendants at these stations transport the requested articles by hand cart from the bin in which they are stored to the loader mechanism at the station. The code mechanism is set to give the particular removal station and consolidation table (521) to which the article is to be sent and then is loaded on the next empty carrier.

After both articles A and articles B have arrived at the particular removal station and consolidation table 521 to which they were sent from the storage zone, and have been checked by an attendant in the removal zone, the attendant at the dispatch station, who can see the entire removal zone, operates a gate G to release the articles onto a moving belt conveyor 150 or 151, depending on which consolidation table in the removal station the articles are transferred to. The articles are carried along belt conveyor 150 or 151, in the direction indicated by arrow S, to a belt conveyor 152, moving in direction N, which connects to a belt conveyor 153, traveling in direction O and leading to a wrapping area (not shown) where the articles are wrapped and shipped out of the warehouse.

We claim:
1. Apparatus for putting articles into storage and removing articles from storage comprising:
  (a) a plurality of carriers,
  (b) means defining an endless path for said carriers,
  (c) means to power said carriers for continuous movement in the same direction along said path,
  (d) means at a storage zone to transfer articles to and from moving carriers,
  (e) means at a replenishment zone to put articles onto moving carriers for carriage to said storage zone, and
  (f) means at a removal zone to take from moving carriers articles carried from the storage zone.

2. The apparatus of claim 1 wherein said storage zone has a plurality of stations and said means at the storage zone to transfer articles to and from said moving carriers comprises mechanism at each of said stations to transfer articles to and from said moving carriers.

3. The apparatus of claim 1 wherein said removal zone has a plurality of stations and said means at the removal zone to take from the moving carriers articles carried from the storage zone comprises mechanisms at each of said stations to take from the moving carriers articles carried from the storage zone.

4. The apparatus of claim 2 in combination with means to code each carrier carrying articles from the replenishment zone to the storage zone for a particular station in the storage zone, and means responsive to the coding on a particular coded carrier to activate the mechanism at the storage zone station to transfer the articles from the carrier.

5. The apparatus of claim 3 in combination with means to code each carrier carrying articles from the storage zone to the removal zone for a particular station in the removal zone, and means responsive to the coding on a particular coded carrier to activate the mechanism at the removal zone station for which the carrier is coded to take the articles from the carrier.

6. The apparatus of claim 1 including tote boxes to receive the articles for carriage on the carriers.

7. The apparatus of claim 5 including tote boxes to receive the articles for carriage on the carriers, and including a dispatch station having a loader mechanism to load tote boxes on carriers and having coding mechanism to code carriers so loaded for delivery to particular storage stations.

8. Apparatus for putting articles into storage and removing articles from storage comprising:
  (a) a plurality of carriers,
  (b) means defining an endless path for said carriers,
  (c) means to power said carriers for continuous movement in the same direction along said path,
  (d) means at a replenishment zone to load and code carriers for delivery to a storage zone,
  (e) means at the storage zone to unload articles from carriers coded for the storage zone, and to load and code carriers for delivery to a removal zone, and
  (f) means at the removal zone to unload articles from carriers coded for the removal zone.

9. The apparatus of claim 8 including tote boxes to receive the articles for carriage on the carriers.

10. The apparatus of claim 9 including a plurality of storage stations in the storage zone and including a dispatch station having a loader mechanism to load tote boxes on carriers and having coding mechanism to code carriers so loaded for delivery at particular storage stations.

11. Apparatus for putting articles into storage and removing articles from storage comprising:
  (a) a plurality of carriers,
  (b) means defining an endless path for said carriers,
  (c) means to power said carriers for continuous movement in the same direction along said path,
  (d) means at a replenishment zone to put articles onto randomly selected moving carriers,
  (e) means at said replenishment zone to code said randomly selected carriers for delivery to a storage zone,
  (f) mechanism at the storage zone to transfer articles to and from moving carriers when activated,
  (g) means responsive to the coding on the carriers coded for delivery to the storage zone to activate said transfer mechanism at the storage zone for transfer of articles from said carriers,
  (h) means at the storage zone to code carriers to which articles have been transferred at the storage zone for delivery to a removal zone,
  (i) mechanism at the removal zone to transfer articles from moving carriers when activated, and
  (j) means responsive to the coding on the carriers coded for delivery to the removal zone to activate said transfer mechanism at the removal zone.

12. The apparatus of claim 11 including tote boxes to receive the articles for carriage on the carriers.

13. The apparatus of claim 12 including a plurality of storage stations in the storage zone and including a dispatch station having a loader mechanism to load tote boxes on carriers and having coding mechanism to code carriers so loaded for delivery at particular storage stations.

14. Apparatus for putting articles into storage and removing articles from storage comprising:
  (a) a plurality of carriers,
  (b) means defining an endless path for said carriers,
  (c) means to power said carriers for continuous movement in the same direction along said path,
  (d) a plurality of stations in a storage zone, each of said stations having mechanism operable selectively when activated to transfer articles to and from said moving carriers,
  (e) a plurality of stations in a removal zone, each of said stations having mechanism operable when activated to take articles from said moving carriers,
  (f) means at a replenishment zone to put articles onto said moving carriers,
  (g) means at the replenishment zone to code each moving carrier receiving articles at the replenishment zone for delivery to a particular station in the storage zone,
  (h) means responsive to the code placed on the carrier at the replenishment zone to activate the mechanism at the particular storage zone station for which the carrier is coded to remove articles from the carrier,
  (i) means at each station in the storage zone to code each moving carrier receiving articles at that station in the storage zone for delivery to a particular station in the removal zone, and
  (j) means responsive to the code placed on the carrier at a station in the storage zone to activate the mechanism at the particular removal zone station for which the carrier was coded to remove the articles from the carrier.

15. The apparatus of claim 14 including tote boxes to receive the articles for carriage on the carriers.

16. The apparatus of claim 15 including a dispatch station having a loader mechanism to load empty tote boxes onto carriers and having coding mechanism to code carriers so loaded for delivery at particular storage stations.

17. The apparatus of claim 8 including a plurality of storage bins in the storage area and a plurality of tables in the removal zone.

18. The apparatus of claim 14 including a plurality of storage bins at each storage zone station and a table at each removal zone station to collect articles delivered from the storage zone.

19. Apparatus for putting articles into storage and removing articles from storage comprising:
  (a) a plurality of carriers,
  (b) means defining an endless path for said carriers, (c) means to power said carriers for continuous movement in the same direction along said path, (d) a plurality of stations in a storage zone,
  (1) each of said stations having an unloader mechanism operable when activated to transfer articles from moving carriers,
  (2) each of said stations having a loader mechanism operable selectively to transfer articles to moving carriers, (e) a plurality of stations in a removal zone,
  (1) each of said stations having an unloader mechanism operable when activated to take articles from moving carriers,
  (2) each of said stations having a table to receive articles from the unloader mechanism, (f) means at a replenishment zone to put articles onto moving carriers, (g) means at the replenishment zone to code each moving carrier receiving articles at the replenishment zone for delivery to a particular station in the storage zone, (h) means responsive to the code placed on the carrier at the replenishment zone to activate the unloader mechanism at the storage zone station for which said carrier was coded to remove articles from the carrier, (i) means at each station in the storage zone to code each carrier receiving articles at that storage zone station for delivery to a particular in the removal zone, (j) means responsive to the code placed on the carrier at a station in the storage zone to activate the unloader mechanism at the particular removal zone station for which the carrier was coded to transfer the articles from the carrier to the table.

20. The apparatus of claim 19 in which said endless path is defined by a closed loop track having spaced apart continuously moving trolleys, and in which said carriers are connected to said trolleys.

21. The apparatus of claim 19 including tote boxes to receive the articles for carriage on the carriers.

22. The apparatus of claim 21 including a dispatch station having a loader mechanism to load empty tote boxes onto carriers and having a coding mechanism to code carriers so loaded for delivery at particular storage stations.

23. The apparatus of claim 11 including mechanism at one point in the system to unload articles and including code sensing means operable by all code numbers not effective to operate other unloader mechanism in any of the zones of the system to activate the unload mechanism at said one point.

24. The apparatus of claim 14 including a dead end station having mechanism operable when activated to take articles from the moving carriers, and code sensing means at said dead end station operable to activate said mechanism in response to any code number on a moving carrier not corresponding to any other station in the system.

25. The apparatus of claim 19 including a dead end removal station in the removal zone having an unloader mechanism operable when activated to take articles from said moving carriers, said station having code sensing apparatus operable in response to any carrier coded in a manner not designating any other station to activate said unloader mechanism.

References Cited

UNITED STATES PATENTS

| | | | |
|---|---|---|---|
| 1,500,776 | 7/1924 | Spooner | 214—16 X |
| 2,872,057 | 2/1959 | Wagner et al. | 198—38 X |
| 3,338,177 | 8/1967 | Mirel | 104—88 |

ROBERT G. SHERIDAN, *Primary Examiner.*

U.S. Cl. X.R.

198—38; 214—60, 89

PO-1050
(5/69)

UNITED STATES PATENT OFFICE
CERTIFICATE OF CORRECTION

Patent No. 3,448,870          Dated June 10, 1969

Inventor(s) JULES R. GALLO et al

It is certified that error appears in the above-identified patent and that said Letters Patent are hereby corrected as shown below:

Column 2, line 33, change "a" to --at--, line 43, change "toe" to --tote--. Column 7, line 52, change "tion" to --the code plate, urges the code plate to a vertical position--.

SIGNED AND
SEALED
AUG 4 - 1970

(SEAL)
Attest:

Edward M. Fletcher, Jr.
Attesting Officer

WILLIAM E. SCHUYLER, JR.
Commissioner of Patents